Feb. 24, 1931. E. B. STIMPSON 1,793,647
RIVET SLITTING MACHINE
Filed March 29, 1927 4 Sheets-Sheet 1

Feb. 24, 1931.                E. B. STIMPSON                1,793,647
                            RIVET SLITTING MACHINE
                         Filed March 29, 1927    4 Sheets-Sheet 2

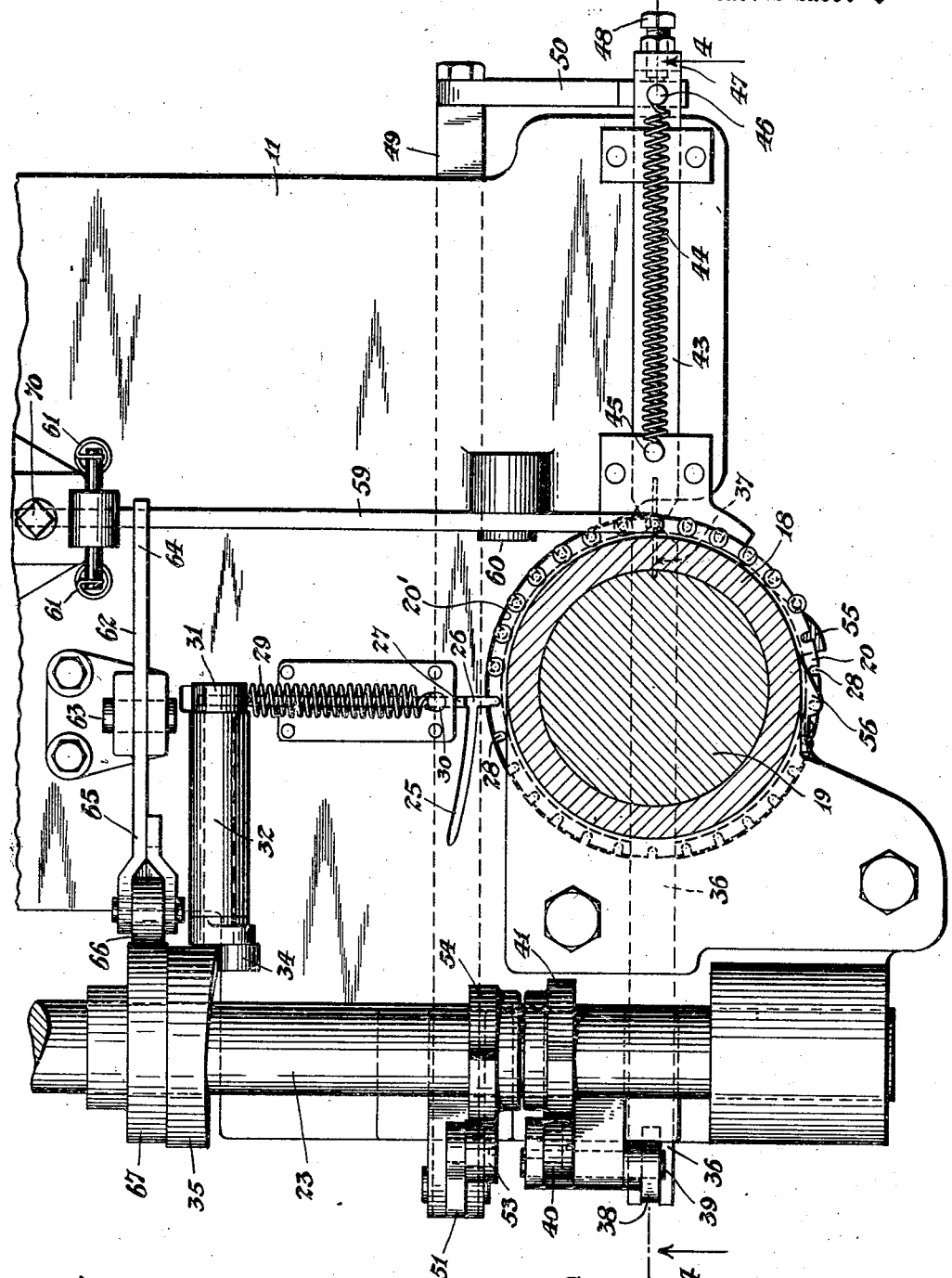

Feb. 24, 1931.   E. B. STIMPSON   1,793,647
RIVET SLITTING MACHINE
Filed March 29, 1927   4 Sheets-Sheet 4
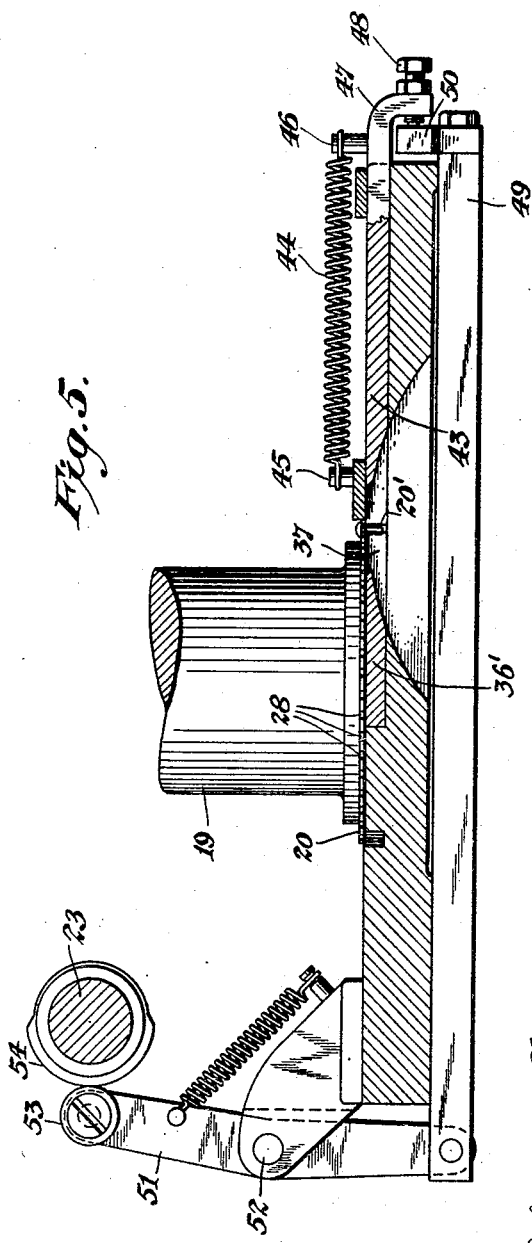
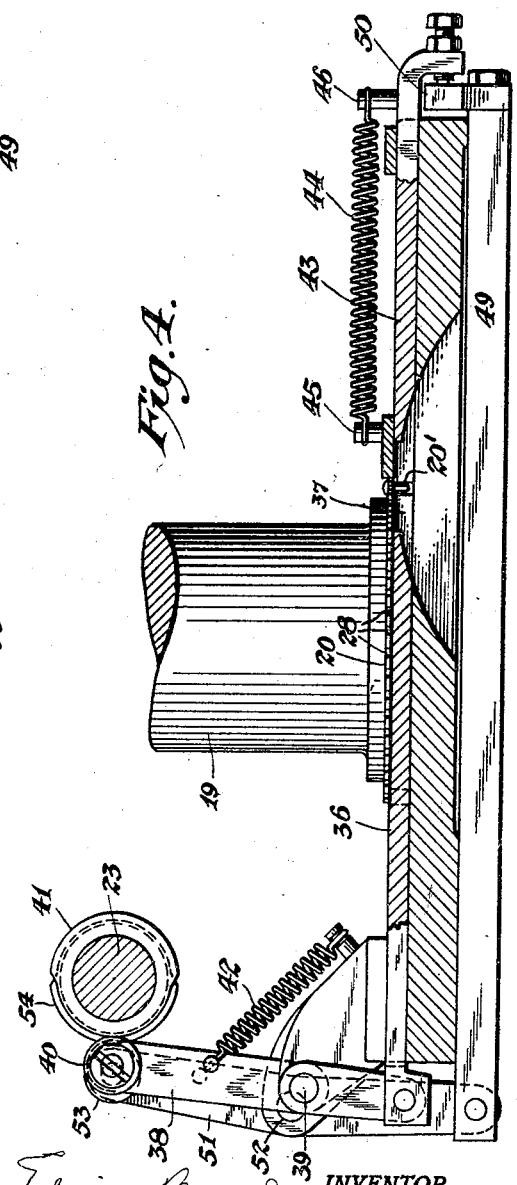

Patented Feb. 24, 1931

1,793,647

UNITED STATES PATENT OFFICE

EDWIN B. STIMPSON, OF BROOKLYN, NEW YORK, ASSIGNOR TO EDWIN B. STIMPSON COMPANY, OF BROOKLYN, NEW YORK

RIVET-SLITTING MACHINE

Application filed March 29, 1927. Serial No. 179,234.

This invention relates to a slotting machine for use in the manufacture of bifurcated rivets.

An object of the invention is to provide a high speed machine capable of producing the rivets accurately and rapidly. To this end the machine embodies a cutting disc having a plurality of cutting saws mounted thereon, and includes improved means for feeding the rivets to the cutting disc and for holding them during the cutting operation.

The holding means include a non-rotative anvil and a holder resiliently pressed toward the anvil to grip the shank of the rivet between them, a notched rotary disc serving to feed the rivets to holding position in front of the anvil.

While I have disclosed a preferred embodiment of the invention for purposes of illustration it should be understood that various changes may be made in the construction without departing from the spirit and scope of the invention as hereinafter set forth and claimed.

In the drawings:

Fig. 3 is a plan view partly in section of a portion of the machine;

Fig. 4 is a section on line 4—4 of Fig. 3;

Fig. 5 is a view similar to Fig. 4 showing a modification.

This application is in part a continuation of my copending application Serial No. 510,195, filed October 25, 1921.

Figure 1:
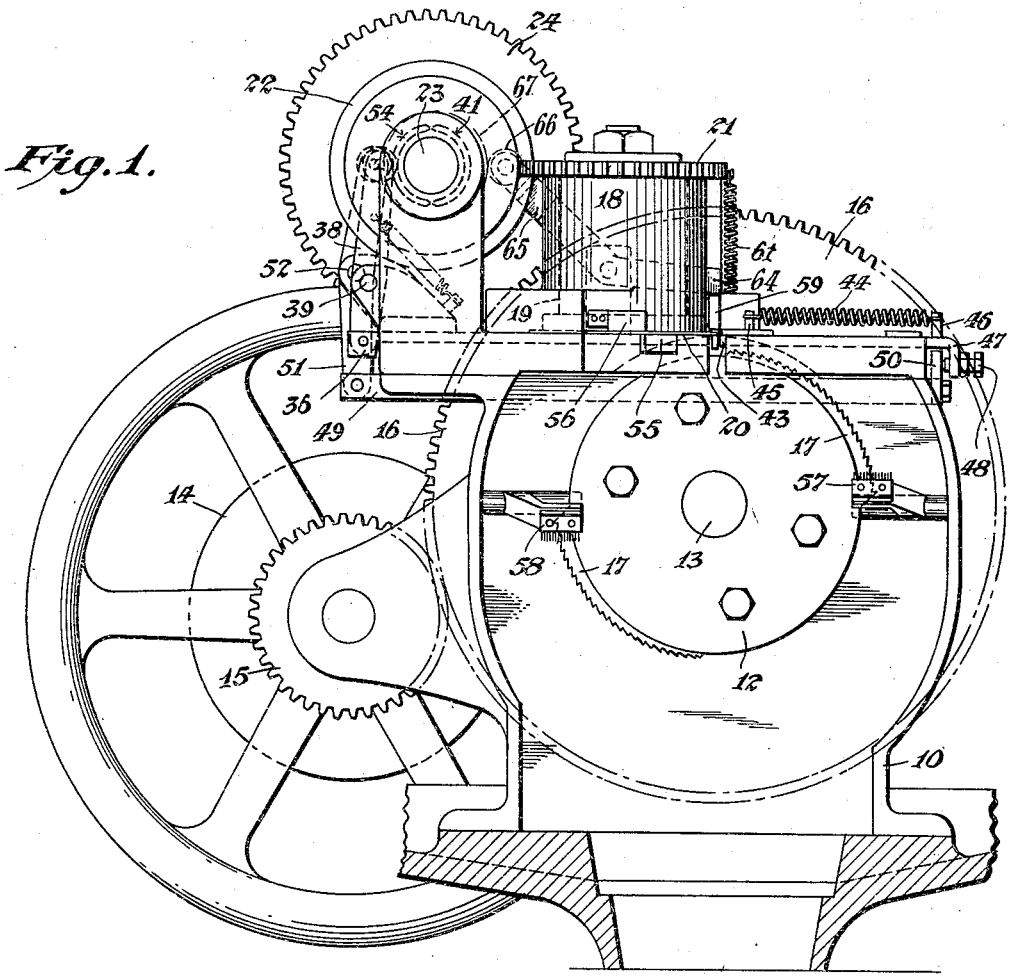
Fig. 1 is a front elevation of a machine embodying the invention.
Figure 2:
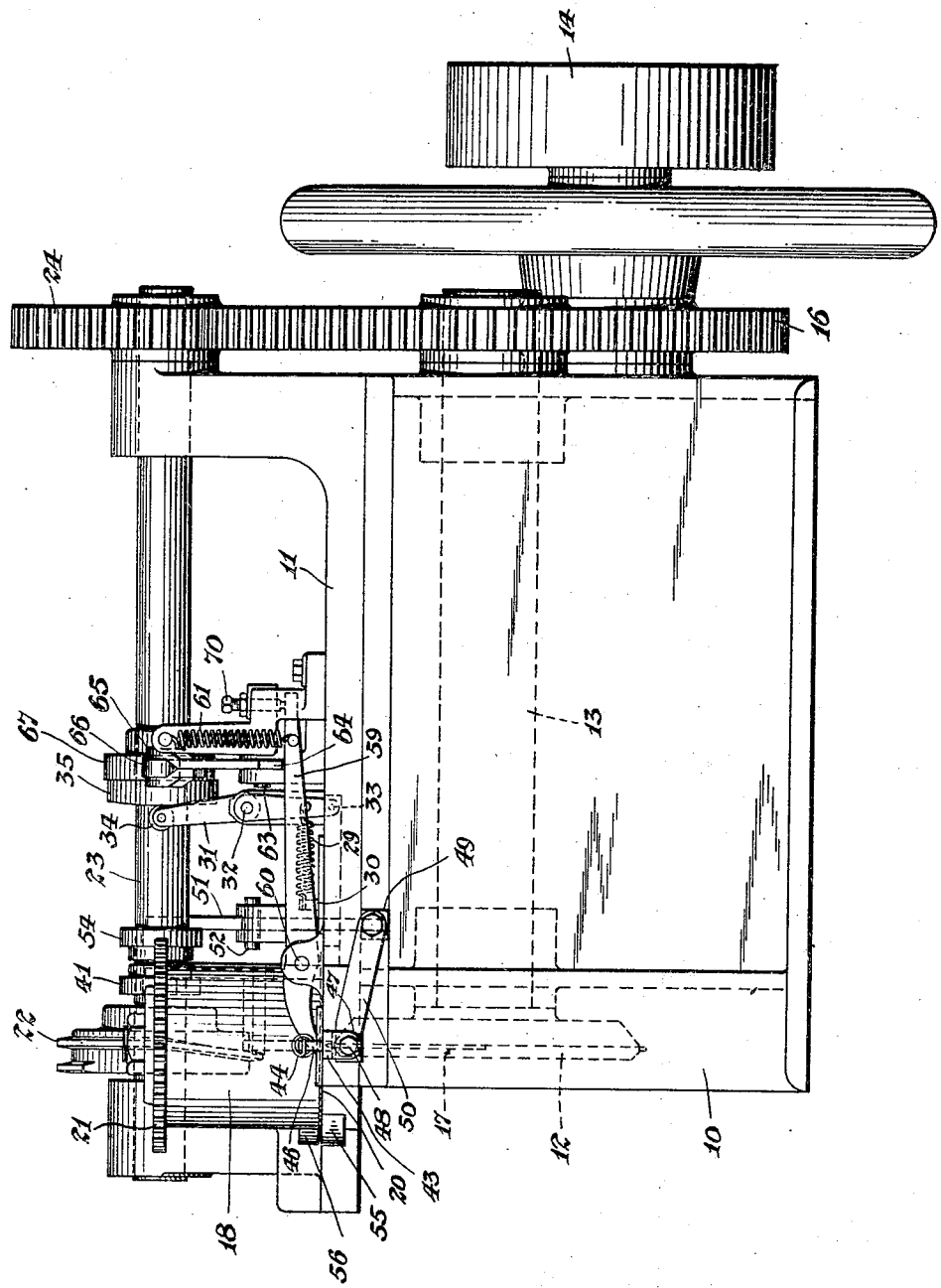
Fig. 2 is a side elevation of the machine.

Referring to the drawings more specifically, the base 10 supports a table 11, upon which the rivet feeding and holding mechanism is mounted. A cutting disc 12 is rotated by shaft 13 which is driven from pulley 14 by gears 15 and 16. The cutting disc has projecting from its periphery a plurality of eccentric cutting saws 17 as clearly shown in Fig. 1.

The rivets are fed to the cutting position by mechanism now to be described. A rotatable post 19 fits into a support 18 mounted on table 11, the post carrying at its lower end a notched feed disc 20 and at its upper end an operating gear 21. A cam in the form of a segmental worm 22 is mounted for cooperation with gear 21 and is carried by shaft 23 mounted on the extreme left end of table 11 (Fig. 3). A gear 24 is keyed to shaft 23 and meshes with gear 16 to operate the shaft 23 in suitable timed relation to the movement of the cutting disc.

The rivets are supplied to the machine through any suitable feed chute which delivers them through groove 25 formed in the table (Fig. 3) to a slot 26 formed normal to the periphery of the feed disc 20. A slide 27 operates in slot 26 to move the rivets into the notches 28 formed in the feed disc 20. The slide 27 is normally held in retracted position by cam 35, but is biased toward disc 20 by a spring 29 having one end attached to a post 30 projecting upward from a plate over the slide and its other end attached to the lever arm which is pivoted to the slide at 33. When the feed disc 20 is in position with one of the notches 28 registering with the slot 26 the slide is operated to push a rivet into the notch 28. The slide is controlled by a lever 31 mounted on a stationary pivot 32 and having its lower end connected to the slide at 33 and its upper end carrying a roller 34 cooperating with a cam 35 rotated by shaft 23.

The rotation of feed disc 20 carries the rivet around the wall 20' of the table to the cutting position where it is firmly held during the cutting operation by the following means. A sliding anvil 36 is mounted on the table beneath the feed disc 20 and has its forward end formed with a tapered nose having a semi-cylindrical vertical notch therein and also having a longitudinal slot 37 cut therein. This anvil is moved forward to the holding position by means of a lever 38 mounted on the pivot 39, and connected at its lower end to the sliding anvil. The upper end of lever 38 carries a roller 40 riding over a cam 41 carried by shaft 23, a spring 42 serving to press the roller against the cam. A holder 43 has its work end formed like that of the anvil 36, and is slidably mounted in confronting relation to the anvil. A spring 44 normally presses the holder toward anvil 36, one end of the spring being anchored to a stationary post 45 on the table, the other end being connected at 46 to the end 47 of the holder. The end 47 is bent to a right angle, and an adjustable contact screw 48 is mounted in the bent end. The holder is reciprocated by a slide 49 which extends below the table and has an arm 50 engaging the contact screw 48. The slide 49 is driven from the shaft 23 through a lever 51 mounted at its center on a stationary pivot 52 and carrying at its upper end a roller 53 cooperating with a cam 54 on shaft 23.

During the cutting operation the rivet is resiliently held down against the cutter by a thrust arm 59 pivoted to the table at 60 and having its operative end normally pressed downward by reason of springs 61 pulling upwardly on its rear end. The thrust arm is operated by a bell crank 62, pivoted to the table at 63 and having one of its ends 64 engaging the upper surface of the thrust arm 59 while its other end 65 extends vertically and carries a roller 66 cooperating with a cam 67 on shaft 23. An adjustable contact screw 70 is carried by a stationary part of the machine and engages the upper side of thrust arm 59 near its rear end. This screw serves to limit the downward movement of the working end of the thrust arm, and keeps it from contacting with the feed disc in case the feed mechanism should fail to place a rivet in the cutting position.

A delivery cam 55 is mounted on the side of the table just below the feed disc 20, and a cleaning finger 56 closely engages the upper surface of disc 20 to scrape from the disc any metal chips or other dust that might otherwise accumulate and interfere with smooth feeding of the rivets. A pair of cleaning brushes 57 are mounted on opposite sides of the cutting disc with their bristles pointing in the direction of rotation of the disc and adapted to engage the cutting saws. A second pair of brushes 58 are similarly mounted on the opposite side of the disc 12. These brushes keep the saw teeth cleared of metal filings, which being magnetic, tend to adhere to the saw and choke it.

The feed disc 20 rotates to move a rivet to the cuttting position during the interval after the passage of one of the saws 17 from the cutting position and before the other saw arrives at the cutting position. At the same time the anvil 36 and holder 43 are retracted from the holding position. In the case of anvil 36 this is accomplished by the low part of cam 41 permitting the upper end of lever 38 to move toward shaft 23 under the influence of spring 42, thereby causing the lower end of lever 38 to move away from sleeve 18, carrying the anvil 36 with it. In the case of holder 43 the retractive movement is caused by roller 53 riding up the high part of cam 54, thereby pushing the slide 49 to the right (Fig. 5) and since the slide 49 positively engages the contact screw 48 it pulls the holder to the right against the tension of spring 44.

Meanwhile the thrust arm has been raised to inoperative position by cam 66 operating on bell crank 62.

After the rivet has arrived at the cutting position the anvil 36 is pushed forward and positively held in that position by engagement of the high part of cam with roller 40. At the same time the low part of cam 54 permits spring 44 to move slide 49 to the left and to press the holder 43 resiliently against the rivet positioned between the notched end of the holder and the anvil. At this time the cam 67 permits the springs 61 to press the thrust arm 59 down on the head of the rivet. By the combination of these parts the rivet is held firmly, yet resiliently, during the cutting operation.

The further operation of the machine now causes one of the saw blades 17 to cut a slit in the shank of the rivet in a well-known manner. After the passage of the saw blade the feed disc again rotates, causing the rivet to ride up cam 55 and thereby be discharged from the machine, and simultaneously moving another rivet to the cutting position.

The gearing is so arranged that the feed disc 20 is moved twice during a single rotation of the cutter disc 12, and a fresh rivet is in the cutting position each time a saw 17 passes the cutting position. Likewise, the cams are rotated by shaft 23 in a manner to cause the gripping of each rivet as it reaches the cutting position. The arcuate slot 27 in the anvil and the corresponding slot in the holder permit the saw to reach the shank of the rivet while enabling the anvil and holder to rigidly support the entire length of the shank on each side of the cut during the operation of slitting.

In the species of Fig. 5 the holder operates in the manner hereinbefore set forth, but the anvil 36' instead of being reciprocal is stationary, and hence the rivets must be carried around the nose of the anvil by the feed disc 20.

In either of the species disclosed the anvil member can be readily removed for replacement in case it becomes worn or damaged, and is a relatively cheap part to replace. This structure has marked advantages over the expensive rotary rivet holder against which the rivets were held in some of the prior rivet slotting machines.

The contact screw 48 is adjustable to limit the forward movement of the holder 43 under the influence of springs 44, thereby preventing injurious contact of the holder with the anvil in case no rivet has been fed to cutting position.

I claim:—

1. A machine for operating upon the shanks of rivets comprising a rotatable carrier disc adapted to carry rivets with their shanks projecting from one face of the disc and their heads adjacent the other face of the disc, means to rotate the disc step-by-step to successively advance the rivets to a work station, means at the work station to clamp the heads of the rivets, a pair of movable clamping dies at the work station adapted to clamp the shanks of the rivets in a stationary position independently of the carrier disc and without removing them therefrom, means operative in timed relation to the carrier disc to positively move one of said dies into clamping position, and means to yieldingly urge the other of said clamps into clamping position.

2. A machine for operating upon the shanks of rivets comprising a carrier member adapted to carry rivets with their shanks projecting from one face of the member and their heads adjacent the other face of the member, means to actuate the carrier member step-by-step to successively advance the rivets to a work station, means at the work station to clamp the heads of the rivets in a stationary position, a pair of movable clamping dies at the work station operable to clamp the shanks of the rivets in a stationary position independently of the carrier member and without removing them therefrom, means to positively set one of said movable clamping dies in clamping position, and means to set the other of said movable clamping dies in clamping position by spring pressure.

3. A machine for operating upon the shanks of rivets comprising a first clamping jaw and a second clamping jaw operable to clamp the shank of a rivet at an operating station; means to convey rivets successively to the operating station, said conveyor means comprising a thin member having spaces to receive short lengths of individual rivets shanks adjacent the heads of the rivets; means to insert rivets in said space with the heads of the rivets adjacent one face of said thin member and with the shanks of the rivets projecting from the other face of the thin member; means to operate both of said clamping jaws in timed relation to said conveyor means whereby such clamping jaws are moved into clamping position after the rivet has arrived at the operating station and are restored to non-clamping position before the rivet starts to leave the operating station; spring pressed means to clamp the head of the rivet against said thin member when the rivet is at the operating station; and means to actuate said head clamping means in timed relation to said conveyor means whereby said head clamping means is moved into clamping position after a rivet has arrived at the operating station and is restored to non-clamping position before the rivet starts to leave the operating station.

4. A machine for slotting the shanks of rivets comprising a thin circular feed member positioned in a substantially horizontal plane and having its periphery notched to receive rivet shanks; means to insert rivets head up in the notches whereby the rivets are suspended by their heads with their shanks projecting below said feed member; means to rotate said feed member step-by-step to advance the suspended rivets successively to a slotting station; means to clamp the heads of the rivets at the slotting station; and a pair of cooperative movable clamping dies operable to clamp the shanks of the rivets at the slotting station, each of said clamping dies being arranged to provide slots for the passage of a cutter blade to the shank of the rivet clamp thereby.

5. A machine for slotting the shanks of rivets comprising a rotary cutter head; cutter means projecting from a portion only of the periphery of said cutter head whereby in each revolution of the cutter head at least one portion thereof is active and at least one portion thereof is idle; rivet conveyor means operable to engage the head ends of rivets and convey them laterally to and from cutting position with the rivet shanks in the path of said cutting means; means to actuate said conveyor means in timed relation to said cutter head to advance a rivet to cutting position during an idle period of said cutter head and leave said rivet at rest during the succeeding active period of the cutter head; and a pair of movable clamping means located between said conveyor means and said cutter head to clamp the shanks of said rivet for slotting by said cutter means, said clamping means comprising a movable die member positively set in clamping position and a movable die member set in clamping position by spring pressure, the members being slotted to permit passage of the cutter means to the shank of a rivet clamp thereby.

6. A machine for slotting the shanks of rivets comprising a rotary cutter head; cutter means projecting from a portion only of the periphery of said cutter, whereby in each revolution of the cutter head at least one portion thereof is active and at least one portion thereof is idle; rivet conveyor means operable to engage the head ends of rivets and convey them laterally to and from cutting position with the rivet shanks in the path of said cutter means; means to actuate said conveyor means in timed relation to said cutter head to advance a rivet to cutting position during an idle period of said cutter and leave said rivet at rest during the succeeding active period of the cutter head; clamping means located between said conveyor means and said cutter head to clamp the shank of said rivet for slotting by said cutter means, said clamping means comprising a pair of movable die members; and means to move said die members to and from clamping position in timed relation with the movement of said conveyor means.

In testimony whereof I affix my signature.
EDWIN B. STIMPSON.